Figure 1:
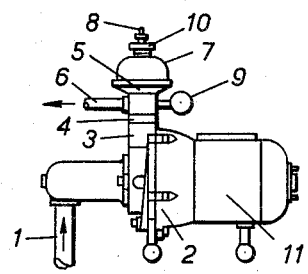

Oct. 15, 1963   O. F. JOHNSEN   3,106,894
PRESSURE OPERATED VALVE, ESPECIALLY FOR WATER SUPPLY SYSTEMS
Filed Oct. 6, 1961

INVENTOR
ODD FREDHEIM JOHNSEN
BY Robert H. Jacob
AGT.

United States Patent Office 3,106,894
Patented Oct. 15, 1963

3,106,894
PRESSURE OPERATED VALVE, ESPECIALLY
FOR WATER SUPPLY SYSTEMS
Odd Fredheim Johnsen, Kristiansand, Norway
Filed Oct. 6, 1961, Ser. No. 143,458
Claims priority, application Norway, Oct. 10, 1960
3 Claims. (Cl. 103—25)

This invention relates to a pressure-operated valve, especially intended for water supply systems, of the kind comprising a small pressure bell which contains a volume of pressure medium sufficient only to enable automatic starting and stopping of the water pump by means of the water pressure; said water pressure operates an electric switch controlling the electric circuit of the pump motor. The object of such a device is to provide fresher water and to eliminate the relatively large water pressure containers, which, besides being costly, require much space. The pressure operated valve is also suitable as a reduction valve and will as such provide a very stable discharge pressure.

A system has previously been proposed in which the large pressure container has been omitted and replaced by a small pressure bell, the pressure of which communicates with the pressure controlled electric motorswitch. The known system has, however, the drawback that the pressure in the discharge line is constantly hunting, the capacity of the pump frequently being greater than the discharge, causing an increase in pressure and disconnection of the motor even if the discharge continues. The pressure in the discharge line will then rapidly decrease during the continued discharge so that the motor is again started, and this is repeated as long as water is discharged from the system.

In U.S. Patent 2,761,389 is described a reduction valve to be used in a water supply system, the valve having a leak or a by-pass from the primary to the secondary side of the system. The drawback with this known valve is that if the pump is to be able to work without hunting during small discharge, the pressure-operated switch must necessarily be made with great precision and react on small pressure differences, as otherwise too much time will lapse between stopping of discharge and disconnection of the pump. The setting of the operating pressure of a water supply system relative to the reduction valve is no simple matter. When at the same time a small pressure container or similar device is required on the primary side of the regulation, such as the tube 22 shown in the drawing relating to said patent specification, the system soon becomes more expensive.

The object of invention is to eliminate these drawbacks and at the same time to achieve that the pump is disconnected almost at the same time as the normal discharge terminates.

The device according to the invention is also suitable as a pressure stabilizer for a supply conduit with variable and partly too low pressure, in that it will act as a normal reduction valve when the pump is not working, i.e. until the pressure falls below the working pressure of the system. The pump is then started so as to deliver the required additional pressure.

The invention more specifically relates to a reduction valve especially for water supply systems in which the discharge line is connected with a motor pump via a supply line, including a non-return valve, a relatively small pressure bell and a pressure operated switch for the pump motor acted upon by the pressure in the discharge line, the water supply from the pump line to the discharge line being regulated by a regulating valve in connection with which there is arranged a by-pass, and the invention is distinguished in that the regulating valve is double acting and consists of a primary valve and a secondary valve arranged parallel thereto, both being operated by the pressure in the pressure bell. Between the pressure medium in the pressure bell and a chamber kept at the same pressure as the water pressure in the discharge line there is preferably, as known per se, arranged a diaphragm controlling the regulating valve. According to a further feature of the invention the diaphragm or a part firmly connected therewith forms one element (the valve seat) of the secondary valve of the regulating valve the other element (valve body) being combined with one element (the valve body) of the primary valve.

Another object of the invention is to substitute the previously used pressure-operated switch, which is operated by the pressure in the discharge line or in the chamber connected therewith, by a range switch requiring no separate adjustment as it is controlled by the pressure in the pressure bell and will thus work within a range determined by the working pressure setting at any time, which pressure in turn controls the regulating valve. In this manner the advantage is obtained that a change of the working pressure in the pressure bell automatically brings about a change of the working range of the pressure operated switch, which otherwise would have to be adjusted in relation to the pressure in the pressure bell. The device according to the invention may, however, also be used together with a normal pressure-operated switch.

These and other features of the invention will be apparent from the following description of an embodiment shown in the drawing.

Figure 4:
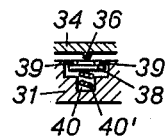
Figure 2:
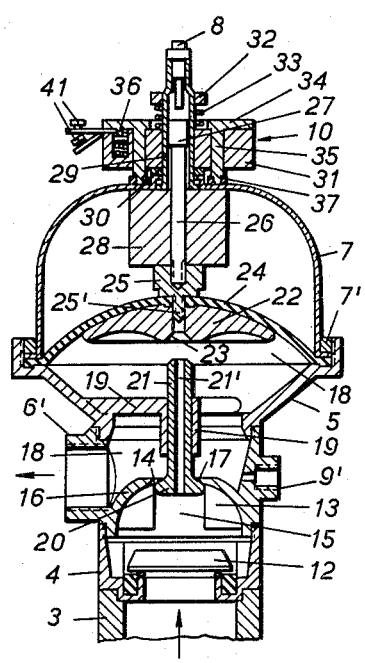
Figure 3:
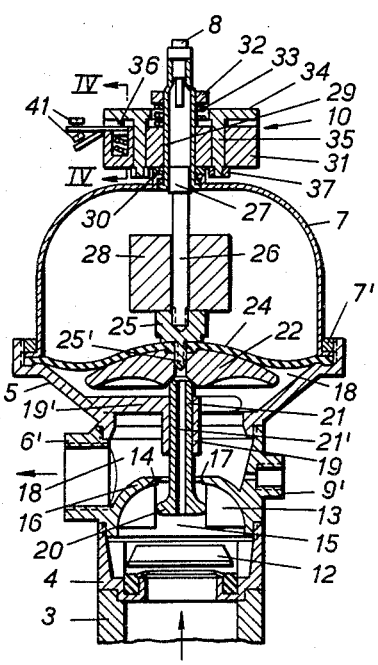

FIG. 1 shows a water supply system and FIGS. 2 and 3 are sectional views of the pressure bell with the regulating valve and parts belonging thereto in two different positions; FIG. 4 shows a detail of the electric range switch.

FIG. 1 shows a water supply system whose main parts consist of a pump 2 with suction line 1 and driving motor 11. Via a passage 3 the pressure side of the pump is connected to a pressure regulating valve device comprising a housing 5, a discharge connecting stud 6' connected with a discharge line 6, and a connecting stud 9' connected to a pressure gauge 9. Above said housing 5 there is arranged a pressure bell 7, on the top of which are located a valve 8 for an air pump and a range switch 10.

As will be seen from the FIGS. 2 and 3 the connecting stud 3 is connected to a non-return valve comprising a housing 4 and a valve body 12. Immediately above said non-return valve, in a partition wall 16 between the lower pressure chamber 15 and the upper pressure chamber 18 there is arranged a double acting regulating valve comprising a primary valve 17, 20 and a secondary valve 21, 23, said valves being arranged in parallel. The primary valve comprises a valve body 20 guided by a number of ribs 13 in the chamber 15 and by a hub 19 arranged in the upper chamber 18. The primary valve seat 17 is formed in the partition wall 16. By radial arms 19' the hub 19 is connected with a housing 5 defining together with the partition wall 16 and a diaphragm 24 fixed above the hub 19 the upper pressure chamber 18. Between the chambers 15 and 18 and in connection with the primary valve 17, 20 a small leak or by-pass 14 has been arranged in known way for balancing the pressure difference of the two chambers 15 and 18, and thus hydraulically controlling the regulating valve 19, 20, 21, 22.

In the embodiment shown, the secondary valve is formed by the upper end of the valve stem 21 of the primary valve 20, said valve stem being bored throughout its length as shown at 21', and a seat 23 being formed in the middle of a disc 22 fastened to the underside of the diaphragm 24. The diaphragm is peripherally secured in the upper opening of the housing 5 between the same and the periphery of a pressure bell 7 made from non-magnetic material, such as stainless steel. The fastening ring of the diaphragm and the pressure bell is numbered 7' and is screwed into the upper opening of the housing 5. As will be seen from the drawing, the diaphragm 24 has a hole in the middle through which extends pin 25' which threadedly engages the disc 22 while its head 25 rests against the top of the diaphragm. The head 25 has threads engaged by a pin 26 having a head 27. An annular permanent magnet 28 is slidingly arranged on said pin.

In the top of the pressure bell a socket 29 having a collar has been inserted and clamped fast to the pressure bell by means of a nut 30 and a packing placed between the pressure bell and the collar. Within this socket 29 the head 27 is guided with good clearance so as not to prevent passage of the air when the desired pressure in the pressure bell 7 is being set, for instance by connecting the valve 8 to a bicycle pump or the like.

Externally the socket 29 carries an electric switch 10 comprising an insulated body 31, preferably cylindrical, and fastened by means of a nut 32 screwed onto the socket 29, and a coil spring 33 arranged between said socket and the body 31, so that the switch may be turned on the socket 29 and adjusted according to the electric wiring. In the insulating body 31 a number of evenly distributed parallel bores are arranged, for a corresponding number of pins 35 which protrude from and are integral with a common disc 34, said pins and said disc also being made from an insulating material. The pins 35 protruding from the bottom of the body 31 together carry a ring 37 of ferromagnetic material, such as soft iron. This ring forms an armature for the permanent magnet 28 which is arranged inside the pressure bell 7. The body 31 also has distributed along its circumference a number of recesses 40 housing the necessary elements of the electric switch assembly, see also FIG. 4 showing a section of FIG. 3 taken along the line IV—IV. In the upper portion of the body 31 two contacts 39 have been inserted through the wall, between which there is placed a metal bridge 38 which is under the action of a coil spring 40' tending to press the bridge 38 to rest against both contacts 39. From the disc 34 a pin 36 extends downwardly and is oriented between the contacts 39 to act upon the bridge for interrupting the current against the action of the spring 40' when the disc 34 is pulled downwardly by the magnet 28 against the upper surface of the body 31. In this manner the connection to the pump motor 11 is interrupted (FIG. 1). The terminals connected to the contact points 39 are numbered 41 and extend laterally from the body 31. Three such contact sets may be evenly distributed around the circumference of the body 31 for connecting and disconnecting the motor 11, which is, in this case, a three-phase motor. When using a single-phase motor one set of contacts is free.

The switch 10, being controlled by the magnet 28 which in turn is moved up and down inside the bell 7 according to the pressure variations in the chamber 18, will automatically work within the air pressure range set in the bell. Consequently, it has the function of a range switch.

In the upper end of the socket 29 is inserted a non-return valve 8, such as a bicycle valve.

The desired discharge pressure is assumed to be 2 kg./cm.² when the system is operating; the pump may have a maximum pressure of 3.5 kg./cm.² and the primary valve 17, 20 may be adjusted for closing the supply from the pump when a pressure of 2 kg./cm.² exists in the discharge line and, consequently, in the chamber 18. During operation the regulating valve and the diaphragm 24 with the disc 22 are in the position shown in FIG. 3, in which the magnet 28 rests on the head 25 and the range switch is closed, the contact bridge or bridges 38 being in the position shown in FIGS. 3 and 4.

During normal discharge the pressure in the bell 7 is somewhat greater than in the chamber 18, so that the disc 22 rests with its lower part on the upper part of the valve stem 21 to keep the passage through the valve 17, 20 constantly open and at the same time keeping the secondary valve 21, 23 closed. Thus, the parts are in the position shown in FIG. 3. This is the case until the discharge ceases. The primary valve is then closed and the small leak 14 causes the pressure in the chamber 18, to rise and the diaphragm 24 and the disc 22 to move upwardly from the resting position on the top of the valve stem 21, so that the secondary valve is opened. This will again cause an immediate filling of the chamber 18 with water through the secondary valve. A similar filling also takes place through the leakage 14, but since the bore 21' in the valve stem 21 is substantially greater, the filling will proceed much more quickly than by the known valves of this kind, such as for instance with a speed of about 600 litres/h. The result is a further rapid lifting of the diaphragm, and by means of the head 25 the magnet 28 is moved upwards against the underside of the bell 7. Due to the effect of the magnet 28 the ring 37 will be pulled downwardly against the upper side of the bell 7 and interrupt the current via the contacts 39 and the bridge 38. The non-return or one way valve 12 will close the passage 3 from the pump. The pressure in the two chambers 15 and 18 will be equal when the system is inoperative and the parts are in the position shown in FIG. 2. The pressure in the chamber 18 will correspond to the delivery pressure of the pump, i.e. about 3.5 kg./cm.², see above, and balance the air pressure of the bell 7, the diaphragm 24 being in its upper position and the permanent magnet 28 keeping the switch 38, 39 open.

When a tap is opened, the pressure in the line 6 and, consequently, also in the chamber 18 will decrease and the diaphragm 24 and the disc 22 will move downwardly and approach their lowest position in which the disc rests on the hub 19. The pin 26 with its head 27 will follow this movement. The magnet will, however, temporarily remain hanging under the top of the pressure bell 7 and only be loosened from same and free the ring 37 and open the switch, shortly before the disc 22 reaches its lowest position, the head 27 engaging the upper side of the magnet, and pulling it down so that the ring 37 is released and slides down to rest against the head 25. The ring 37 is thereby pulled up against the underside of the body 31 under the action of the springs 40' placed in the recesses 40. The system now takes up the position shown in FIG. 3 with the range switch closed and the motor running, the conditions being as already described above.

I claim:

1. A pressure operated valve for water supply systems or the like comprising, a valve housing, a partition wall dividing said housing to define an inlet chamber and an outlet chamber and having a fixed valve seat, a supply line connected to said inlet chamber and a motor pump connected to said supply line, a pressure bell in communication with said outlet chamber and mounted on said housing, said pressure bell having a flexible wall presenting a movable valve seat, a pressure operated switch having current supply contacts mounted on said pressure bell and operative in response to the expansion of said pressure bell upon decrease of the pressure in said outlet chamber below a predetermined value to connect said motor to said current supply contacts and in response to an increase of pressure in said outlet chamber above said value to disconnect said current supply contacts, a regulating valve member extending through said partition wall having a primary valve portion cooperating with said fixed valve seat and defining a primary valve therewith and a secondary valve portion disposed proximate and movable with said movable valve seat, and defining a secondary valve therewith disposed in parallel relationship to said primary valve portion, and a by-pass intermediate said inlet and outlet chambers.

2. A pressure operated valve for water supply systems or the like comprising, a valve housing, a partition wall dividing said housing to define an inlet chamber and an outlet chamber and having a fixed valve seat, a supply line connected to said inlet chamber and a motor pump connected to said supply line, a pressure bell in communication with said outlet chamber and mounted on said housing, said pressure bell having a flexible wall presenting a movable valve seat, a pressure operated switch having current supply contacts mounted on said pressure bell and operative in response to the expansion of said pressure bell upon decrease of the pressure in said outlet chamber below a predetermined value to connect said motor to said current supply contacts and in response to an increase of pressure in said outlet chamber above said value to disconnect said current supply contacts, a regulating valve member extending through said partition wall having a primary valve portion cooperating with said fixed valve seat and defining a primary valve therewith and a secondary valve portion disposed proximate and movable with said movable valve seat, and defining a secondary valve therewith disposed in parallel relationship to said primary valve portion, and a by-pass intermediate said inlet and outlet chambers, said pressure bell containing a gaseous pressure medium and said flexible wall being a pressure responsive diaphragm movable to engage said valve member with said movable valve seat to disengage said primary valve portion from said fixed valve seat.

3. A pressure operated valve for water supply systems or the like comprising, a valve housing, a partition wall dividing said housing to define an inlet chamber and an outlet chamber and having a fixed valve seat, a supply line connected to said inlet chamber and a motor pump connected to said supply line, a pressure bell in communication with said outlet chamber and mounted on said housing, said pressure bell having a flexible wall presenting a movable valve seat, a pressure operated switch having current supply contacts mounted on said pressure bell and operative in response to the expansion of said pressure bell upon decrease of the pressure in said outlet chamber below a predetermined value to connect said motor to said current supply contacts and in response to an increase of pressure in said outlet chamber above said value to disconnect said current supply contacts, a regulating valve member extending through said partition wall having a primary valve portion cooperating with said fixed valve seat and defining a primary valve therewith and a secondary valve portion disposed proximate and movable with said movable valve seat, and defining a secondary valve therewith disposed in parallel relationship to said primary valve portion, and a by-pass intermediate said inlet and outlet chambers, said pressure bell containing a gaseous pressure medium and said flexible wall being a pressure responsive diaphragm movable to engage said valve member with said movable valve seat to disengage said primary valve portion from said fixed valve seat, said diaphragm supporting a switch operating stem and a permanent magnet within said pressure bell and said switch including a member movable with said stem to open and close said contacts and an armature cooperating with said magnet to maintain said switch in open condition during the high pressure condition in said pressure chamber.

References Cited in the file of this patent

UNITED STATES PATENTS

| | | |
|---|---|---|
| 2,118,130 | Aikman | May 24, 1938 |
| 2,356,306 | Davis | Aug. 22, 1944 |
| 2,535,752 | O'Connell | Dec. 26, 1950 |
| 2,761,389 | Turner | Sept. 4, 1956 |

FOREIGN PATENTS

| | | |
|---|---|---|
| 673,815 | Germany | Mar. 29, 1939 |